Figure 1:
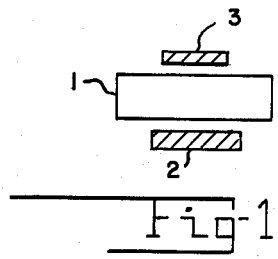

March 10, 1964  I. BERMAN  3,124,454

METHOD OF MAKING SILICON CARBIDE NEGATIVE RESISTANCE DIODE

Filed June 20, 1961

INVENTOR.
IRVIN BERMAN
BY
ATTORNEYS 3,124,454
METHOD OF MAKING SILICON CARBIDE NEGATIVE RESISTANCE DIODE
Irvin Berman, Swampscott, Mass., assignor to the United States of America as represented by the Secretary of the Air Force
Filed June 20, 1961, Ser. No. 118,477
1 Claim. (Cl. 75—177)
(Granted under Title 35, U.S. Code (1952), sec. 266)

The invention described herein may be manufactured and used by or for the United States Government for governmental purposes without payment to me of any royalty thereon.

The present invention relates to non-linear diodes and, more particularly, to an Esaki or tunnel type diode which is capable of beginning to operate only at a relatively high temperature level.

It is the principal object of this invention to provide a silicon carbide tunnel diode structure capable of operating under non-linear characteristics at approximately 0.05 to 0.6 volt and 1 to 3 milliamperes of current after starting the device by heating it to between 500° and 700° C. by passing excess current through the device.

Other objects, novel features, and the advantages of this invention will become apparent upon consideration of the embodiments illustrated in the accompanying drawings and hereinafter to be described.

Figure 2:
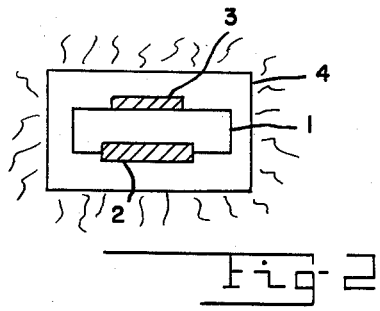
Figure 3:
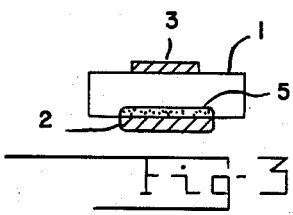
Figure 4:
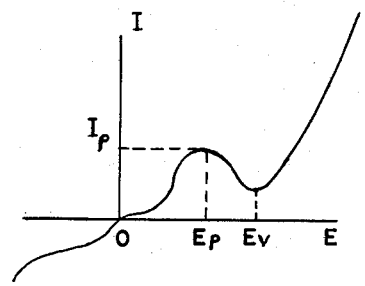

In the drawings:

FIGURES 1 through 3 schematically illustrate the procedural steps required to fabricate the silicon carbide diode of the invention; and FIGURE 4 is a representation of the characteristic curve of the instant silicon carbide diode.

Referring now more particularly to FIGURE 1, there is shown a highly doped silicon carbide platelet 1, an alloying contact platelet 2, and an ohmic contact platelet 3. The platelets are pressed together with the alloying contact on one side of the silicon carbide platelet and the ohmic contact on the other side. The assembly is inserted as illustrated in FIGURE 2 in furnace 4 which has an insert atmosphere.

The assembly is heated to temperature above the melting point of the alloying contact but below the sublimation point of silicon carbide (2200° C.) for a very short period of time in the furnace 4. The alloying contact 2 melts under the heat and dissolves some of the silicon carbide platelet 1 which gives an alloy solution. The inert atmosphere, such as argon gas, is used where the metallic contacts would react with the oxygen in an air atmosphere under the high temperature conditions involved. The heat is removed and the solution and alloying contact allowed to freeze.

FIGURE 3 illustrates the silicon carbide tunnel diode structure completely formed. During recrystallization the behavior of the impurities in the highly doped silicon carbide platelet causes a heavy concentration of donors or acceptors at the alloy-silicon carbide material boundary area 5. The ohmic contact is composed of a metal which will not melt materially but will adhere securely to the silicon carbide after the removal of the heat. The weight of the metal itself is sufficient to allow the adherence.

The silicon carbide platelet is highly doped and can, of course, be either N or P type depending upon the donor or acceptor predominance present. The impurities in the N-type silicon carbide which contribute electrons are termed donors and principally fall in the fifth group of the periodic table. The impurities in the P-type silicon carbide which contribute "holes" are termed acceptors and fall in the third group of the periodic table. Typical donors include phosphorus, arsenic, and antimony, while boron, aluminum, gallium and indium are typical acceptors. The silicon carbide platelet has impurity densities greater than $10^{19}$ atoms/cm.$^3$ which is many times the magnitude that is used in typical semiconductor devices.

The alloying contact 2 is preferably disc shaped and about one-half the thickness of the silicon carbide platelet. Metals from the third group of the periodic table are used as the contact on N-type silicon carbide to give a highly P-type boundary region after alloying. When using P-type silicon carbide, the contact must be a metal from the fifth group of the periodic table.

The ohmic contact 3 may be in the shape of a ring. A typical material for this contact is the metal rhenium which has a melting point of 3400° C. Silver may also be used as an ohmic contact. While silver has a melting point substantially lower than rhenium this fact does not interfere in this use.

The tunnel diode device was made using a platelet of highly doped silicon carbide of $10^{-1}$ to $10^{-2}$ ohm centimeter resistivity and 1 millimeter thick, a ring of rhenium and a disc of aluminum approximately 1 millimeter diameter and ½ millimeter thick. The rhenium ring was placed on one side of the silicon carbide platelet and the disc of aluminum on the other side. The parts of the assembly were held securely in place and inserted in a furnace having an argon atmosphere. The assembly was heated to approximately 1800° C. for 20 seconds. The heat was removed and the assembled diode device allowed to cool to room temperature.

The characteristic curve of the instant non-linear diode shown in FIGURE 4 differs materially from that of conventional non-linear diodes in that on the conventional diodes the curve usually begins at above 0.6 volt and what happens between 0 and 0.6 is not known. The device of this invention can operate in the region between 0 and 0.6 volt with a characteristic negative resistance between the peak voltage $E_p$ and the valley voltage $E_v$. This silicon carbide diode operates under non-linear characteristics at about 0.05 to 0.6 volt and 1 to 3 milliamperes of current. To make the device go into the non-linear characteristics, the device is heated to approximately 500° to 700° C. by passing excess current through it. Once the non-linearity curve is displayed, changes in the applied voltage do not affect the stability of the characteristics of the device. The operating temperature range is considerably greater than the 500° to 700° C. used to start the operation of the device.

While a specific embodiment of the invention has been described in detail by way of illustration, it is understood that the invention is defined solely by the appended claim and embraces any embodiments falling within the terms and spirit thereof.

I claim:

The process of fabricating a diode exhibiting in the 500° C. to 700° C. temperature range a negative resistance characteristic terminating at approximately 0.6 volt in the forward direction comprising the steps of: preparing a 1.0 mm. thick platelet of silicon carbide semiconductor of n-type conductivity sufficiently doped to provide a resistivity of $10^{-1}$ to $10^{-2}$ ohm-centimeter, placing an ohmic contact to one side of said platelet, placing an aluminum disc of approximately 1.0 mm. diameter and 0.5 mm. thickness on the other side of said platelet opposite said ohmic contact, heating the resultant structure at a temperature of about 1800° C. maintained for about 20 seconds in a furnace charged with the atmosphere of an inert gas, and removing the heat and allowing cooling to room temperature so that at said other side of said platelet a silicon carbide p-n junction is formed.

References Cited in the file of this patent

UNITED STATES PATENTS

| | | |
|---|---|---|
| 2,937,323 | Kroko et al. | May 17, 1960 |
| 3,027,501 | Pearson | Mar. 27, 1962 |

OTHER REFERENCES

Handbook of Chemistry and Physics, 26th ed., 1942–1948, pages 308, 309.